Dec. 16, 1952 W. K. MAURER ET AL 2,621,907
STIRRING APPARATUS
Filed July 25, 1950 3 Sheets-Sheet 1
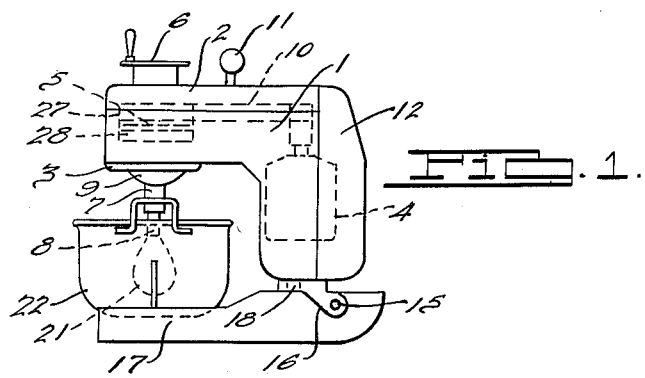
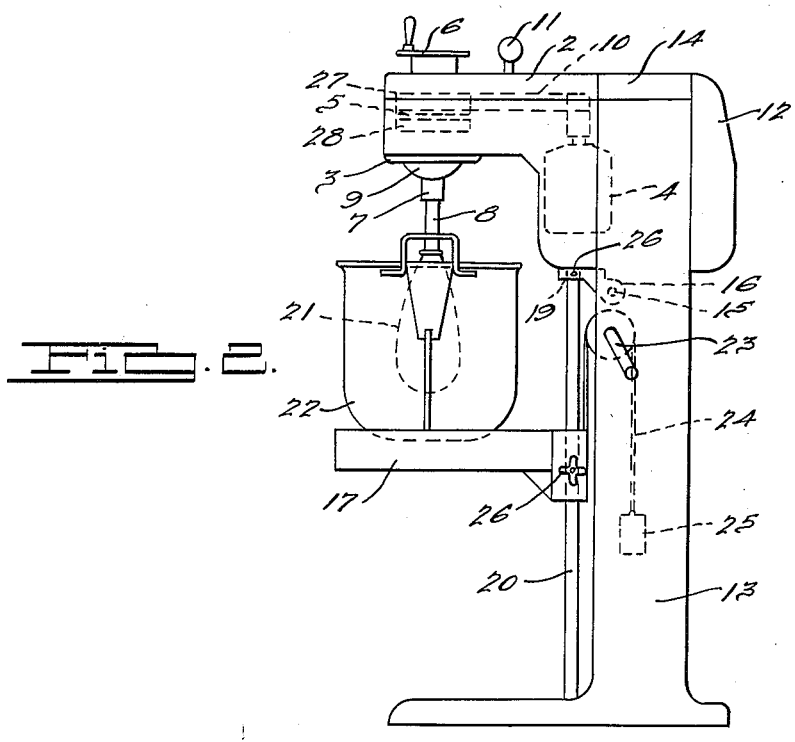
INVENTORS.
Willy K. Maurer,
Kurt F. Schoen,
Kurt P. Frey.
BY
Harness, Dickey & Pierce
ATTORNEYS.

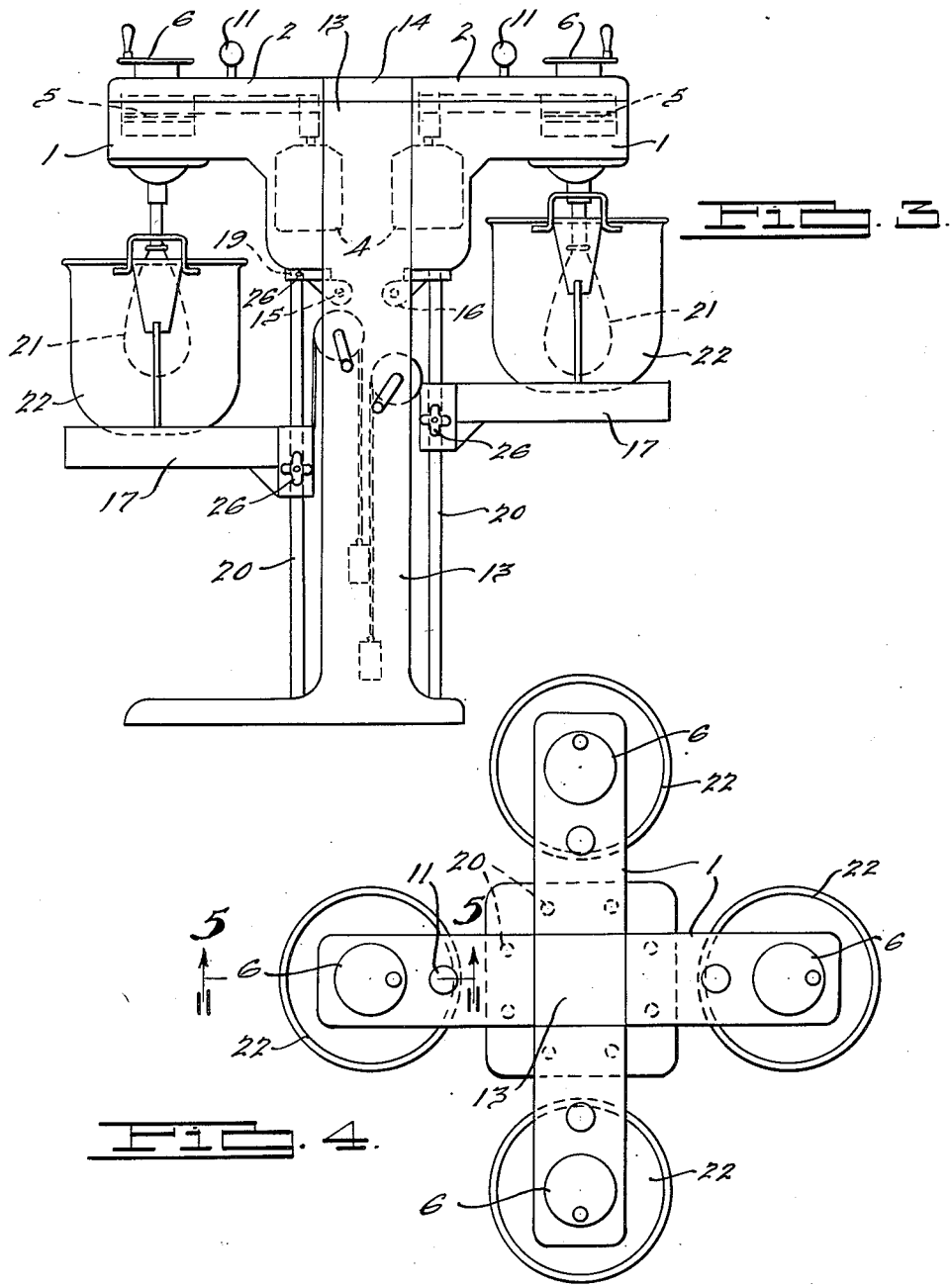

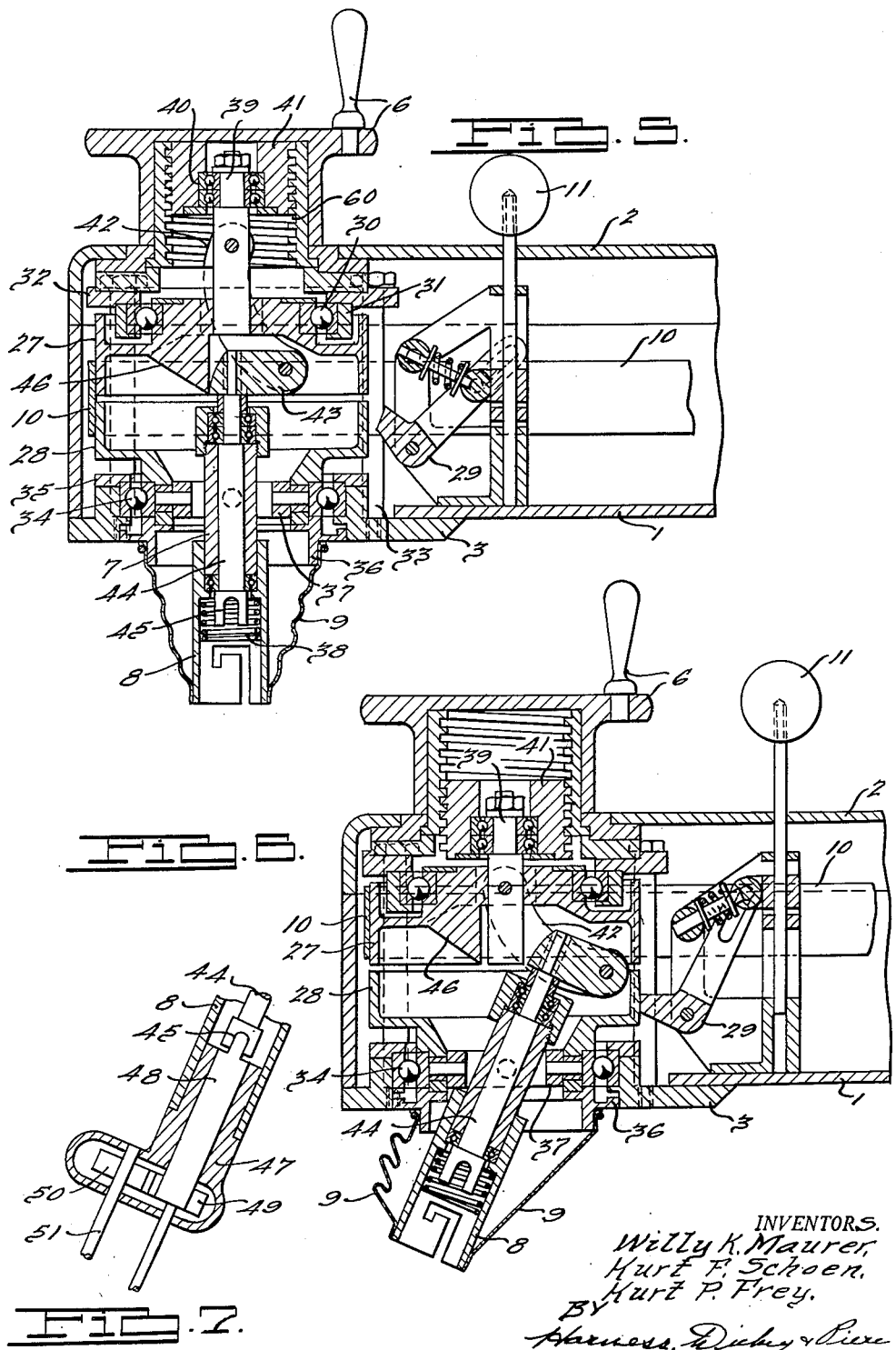

Patented Dec. 16, 1952

2,621,907

UNITED STATES PATENT OFFICE 2,621,907

STIRRING APPARATUS

Willy K. Maurer, Kurt F. Schoen, and Kurt P. Frey, Augsburg, Germany, assignors to Herbert W. Link, Detroit, Mich.

Application July 25, 1950, Serial No. 175,746
In Germany July 30, 1949

9 Claims. (Cl. 259—129)

This invention relates to mixing and stirring devices, and particularly to a mixing and stirring device having one or more individual driving units for mixing liquid solid and semisolid substances.

The main objects of the invention are: to construct a mixing device employing a unit driving and control mechanism; to provide a unit driving and control mechanism for a mixing device which may be employed as a single unit or several of which may be employed to provide a multiple mixing machine; to provide a unit driving and control device for a mixing machine mounted for tilting movement so as to raise the mixing tool from the container in which the material is mixed; to provide a central pedestal having a plurality of units each containing a driving and control mechanism and each having an adjustable table associated therewith on which the containers for the materials to be mixed may be supported and raised and lowered to and from mixing position, and, in general, to provide a mixing machine which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a side view in elevation of a table type mixing machine embodying features of the present invention;

Fig. 2 is a side view in elevation of a pedestal type mixing machine having a movable table;

Fig. 3 is a view in side elevation of a pedestal machine having two mixing units thereon and two movable tables for the containers, one for each unit;

Fig. 4 is a plan view of a machine having four mixing units thereon;

Fig. 5 is a vertical sectional view of the structure illustrated in Fig. 4, taken on the line 5—5 thereof, with the tool holder in central position and with the belt shifted to central position;

Fig. 6 is a view of structure, similar to that illustrated in Fig. 5, with the tool holder disposed in angular position and with the belt shifted to upper position, and Fig. 7 is a view of structure, similar to that illustrated in Fig. 6, with a tool supported in the tool holding element thereof.

The mixer of the present invention embodies a supporting element 1 which is L-shaped in form, having a vertically and horizontally extending portion. The support is a casting which is channel shape in section having the horizontal portion which opens upwardly enclosed by a removable cover 2. An opening is provided in the bottom of the horizontal portion through which the driving mechanism extends and which is enclosed by a plate 3. The vertical portion of the supporting element contains a motor 4 which is preferably of the variable speed type, a small portion of the motor extending outwardly from the channel section of the vertical portion. The operating mechanism is mounted in the forward end of the horizontal portion of the supporting element 1, having thereon a pair of pulleys 27 and 28 which are engaged by a belt 10 driven from the pulley on the end of the shaft of the motor 4. A hand wheel 6 projects upwardly from the cover 2 for tilting a tool supporting shaft 7 to a desirable angular degree. The end of the shaft 7 supports a sleeve 8 having a bayonet slot therein for supporting the tool by which the material in the container is mixed and stirred.

A control device 11 is provided within the supporting element 1 for the purpose of shifting the belt 10 relative to the pulleys 27 and 28. It is to be understood that the motor 4 may be spring mounted to provide a predetermined tension on the belt or other mounting may be provided for adjusting the motor for the purpose of tensioning the belt, as is well known in the art. The rear open face of the vertical portion of the supporting element 1 is enclosed by a removable cover 12 which also encloses the open end of the top cover 2. It will be noted in Figs. 2, 3 and 4 that one supporting element 1 may be fixed to a floor-engaging pedestal 13 or that a plurality of the supporting elements may be secured on a single pedestal. When a single machine is mounted on a pedestal, as illustrated in Fig. 2, the portion of the motor projecting beyond the vertical portion of the supporting element 1 extends within the pedestal, the opposite open face thereof being enclosed by the cover 12. An additional cover 14 is then utilized to enclose the top of the pedestal extending the cover 2 to the cover 12.

In Fig. 3, in place of the cover 12 utilized in Fig. 2, a second supporting element 1 is secured to the pedestal for providing a double mixing device, the mixing devices balancing each other when disposed in aligned relation on opposite sides of the pedestal. A third and fourth supporting element 1 may be applied to the pedestal providing three or four mixing devices on one pedestal. When three mixing devices are to be employed, a cover 12 may be utilized for enclosing the opposite face of the pedestal, the four mixing devices on one pedestal being illustrated in Fig. 4.

The supporting element 1 has an integral cast portion, or a separate casting may be provided secured to the element, having thereon spaced lugs 16 in which apertures 15 are provided. Suitable trunnions are employed for securing the brackets to a table type of base 17, as illustrated in Fig. 1, in which the trunnions are threaded or otherwise secured. The casting extending between the lugs engages the top of the base 17 and thereby limits the forward tilting position of the supporting element 1. It is to be understood that the supporting element tilts upwardly from the position illustrated for removing the tool 21 from the container 22. Apertures are preferably provided in the base 17 by which the base may be secured to a table, platform or the like.

Preferably the bosses 16 are machined on the inner and outer faces to predetermined dimensions so that in the structure illustrated in Fig. 1 the bosses may span the base 17, while in the structure illustrated in Figs. 2, 3 and 4, the bosses may extend within side walls of the pedestal 13 to be mounted on trunnions provided thereon. In the latter case, the casting portions between the bosses 16 have a pair of apertures 19 provided therethrough for securing the upper ends of guide rods 20, the opposite ends of which extend into apertures in the base of the pedestal to which they are secured. The base 17, in the nature of a table provided on the machines illustrated in Figs. 2, 3 and 4, slides upon the pair of rods 20, the table being counterbalanced by a weight 25 on a cable 24 which passes over a pulley operated by a crank arm 23 which projects outwardly from the wall of the pedestal 13. The table is adjusted upwardly and downwardly on the rods 20 through the operation of the crank arm 23 driving the pulley or sprocket over which the pulley cable or chain 24 extends. After adjustment, a clamping screw 26 may be tightened for retaining the table in adjusted position. In this arrangement it will be noted that the supporting element 1 is fixed to the base of the pedestal and is not tilted relative thereto, tilting not being necessary since the table 17 may be raised and lowered relative to the drive shaft 7.

The tool 21, which may be a beater, a crank arm or other type of mixing tool, has a pin provided on the upper end by which the tool is secured within the sleeve 8 and anchored therein within the bayonet slot provided in the wall of the sleeve. A single or preferably a plurality of slots are employed to securely anchor the tool within the sleeve. A mixing container 22 is supported upon the table 17, and in Fig. 1 the tool 21 is insertable and removable relative to the container 22 through the tilting of the supporting element 1 on the trunnions which project within the apertures 15 of the lugs 16.

In the structures illustrated in Figs. 2, 3 and 4, the positioning of the tool 21 in the container is effected by the raising of the table or tables 17 in a manner as hereinabove explained. It is to be understood that the supporting element 1, as illustrated in Fig. 1, may be counterbalanced in the usual manner and preferably was constructed as to have the cover 12 strike the adjacent portion of the base 17 when the element is raised so as to retain the element in raised position. It is to be understood that while the pair of rods 20 secured to the supporting element 1 and the base of the pedestal 13 are utilized for supporting the table 17, other mechanisms such as hydraulic cylinders, screw jacks and the like may be utilized for this purpose.

The driving mechanism, as illustrated in Figs. 5, 6 and 7, is operated through the pulleys 27 and 28 from the belt 10, which is regulated by adjustment of the belt upwardly or downwardly on the pulley faces. By the use of a belt shifting device 11, the belt may be shifted to drive the pulleys individually or simultaneously. The lower part of the belt shifting device 11 has a brake shoe 29 which, as illustrated in Fig. 6, when the belt 10 is moved to raised position through the upward movement of the handle of the device, the shoe engages the lower pulley 28 to apply a braking force thereto to prevent its rotation while the upper pulley 27 is being driven.

The pulleys 27 and 28 are supported within the mechanism on suitable ball bearings, the upper pulley 27 being secured to a plate 32 by a ring 31 which engages the outer race of the ball bearing 30, the inner race of which is secured to the hub of the pulley. The plate 32 is supported on a plurality of studs 33 which are secured to the bottom cover plate 3. The lower pulley 28 is supported by a ball bearing 34 directly to the plate 3, the ball bearing being clamped in position between a stationary annular ring 35 and an annular sleeve 36 which rotates with the pulley. The sleeve 36 supports one end of the flexible collar 9 in a suitable manner, the opposite end of which is secured to the tool supporting sleeve 8. The sleeve rotates with the pulley and prevents any lubricant or other matter from dropping onto the mixing tool and into the material to be mixed.

The hollow shaft 7 is connected to the pulley 28 through the universal or gimbal-like suspension 37 so as to provide a complete universal support. A spring 38 is secured within the tool supporting sleeve 8 for the purpose of applying a bias downwardly to the end of the tool, thereby to lock it within the bayonet slots. A stud 39 extends upwardly from the hub of the pulley 27 in a position to shift axially of the hub for moving a pair of links 42 which are pivoted thereto. The upper end of the stud is connected through ball bearings 40 to a boss 41 having threads on the outer periphery thereof. A sleeve 60 has an internal thread engaging the thread on the boss 41, the sleeve 60 being secured to the housing on which the operating handle 6 is secured.

In Fig. 5 the threaded boss 41 is illustrated in upward position, with the hollow shaft 7 disposed in alignment with the stud 39. In Fig. 6 the threaded boss 41 is illustrated in downward position with the hollow shaft 7 tilted at a substantial angle relative to the stud 39. An eccentric arm 43 is connected to a central shaft 44 provided within the hollow sleeve 7. The end of the eccentric plug is pivoted to the lower ends of the links 42, and through the adjustment of the stud 39 in raised and lowered position, the desired amount of tilt is thereby provided to the hollow sleeve 7 and the shaft 44 provided therewithin.

The shaft 44 is supported at its upper and lower ends by ball bearings in the conventional manner. A slot 45 is provided at the lower end of the shaft 44 for receiving the projecting end of a tool to be in rotative driving relation therewith. The shaft 44 rotates with the pulley 27 at the same angular velocity and direction and its angular disposition is controlled by the axial position of the stud 39.

Similarly, the hollow sleeve 7 rotates with the pulley 28 with the same angular velocity and direction as that of the pulley. A stop 46 is provided on the hub of the pulley 27 with which the arm 43 engages for aligning the shaft 44 with the stud 39. A suitable index scale may be provided adjacent to the hand wheel 6 for indicating the degree of tilt provided to the shaft 44.

When the belt 10 drives the pulley 27, as illustrated in Fig. 6, the shafts 7 and 44 rotate therewith and describe a conical path, the degree of which is controlled by the position of the hand wheel 6. Such a motion is desirable when beating the material within the container. When the belt 10 drives both of the pulleys 27 and 28, as illustrated in Fig. 5, a rotation around its axis is superimposed on the conical motion of the shaft 7. Such a motion will provide both a beating and stirring operation on the contents of the container 22. When a stirring motion alone is desired, then the adjusting handle 6 is operated to have the shaft 44 aligned with the stud 39, as illustrated in Fig. 5, and only a rotating stirring motion will thereby be provided.

With the above description of the beating and stirring operations, the mixing can be performed by a simple cage type tool 21 which is supported on the end of the hollow shaft 7 through the bayonet attachment of the sleeve 8 without connection with the shaft 44. Through the operation of the hand wheel 6 and the adjustment of the belt adjusting mechanism 11, the machine can be changed from beating to stirring or from either beating to stirring to beating and stirring without stopping the machine.

In addition to the operations above described for beating, stirring, and beating and stirring, may be added the rotation of the tool effected by the driving connection of the tool with the slot 45 of the shaft 44. This additional drive is illustrated in Fig. 7 when a multiple tool having a main shaft 48 drives a gear 49 which in turn drives a gear 50 and a shaft 51, all of which are mounted within the housing 47 which is supported within the sleeve 8 by the bayonet type of connection heretofore mentioned. Besides the driving of the housing 47 through the hollow shaft 7, the two shafts 48 and 51 are also relatively driven in rotation about a conical path or on the axis of the stud 39. When the upper pulley 27 only is driven, with the shaft 44 aligned with the stud 39, then the tools on the end of the shafts 48 and 51 perform the stirring operation, this operation being more intense than when a single tool is driven in one direction, since the tools on the shafts 51 and 48 operate in opposite direction to each other. If, in addition, the shafts 7 and 44 are tilted, then, in addition to the intensive stirring motion, a beating motion is added, and such a beating motion on a conical surface is much more intense than when a single tool is utilized. When both of the pulleys 27 and 28 are being driven, the housing 47 rotates with the same angular velocity and direction as the shaft 48. At the same time, the driving of the gears 49 and 50 with respect to each other is interrupted, that is to say, shaft 51 rotates around shaft 48 which executes the beating and stirring motions without rotation with respect to shaft 48 so that an intensive working of the material to be mixed is produced by the combined beating and stirring of the two tools mounted, respectively, on the shafts 48 and 51. Additional effects may be obtained by employing a single or double type of tool when the tools are driven at different angular velocities or in opposite directions. In the latter case, the shaft 45 will be driven in an opposite direction to the tool supporting sleeve 8. Various types of tools may be employed singly or multiply on the shafts 48 and 51, cage types of tools may be used, the interrelated beater types of tools can be operated, and propeller types of stirrers may be utilized. It is to be understood that separate motors may be provided for driving each of the belts, the motors being preferably of the reversible type so that a change of direction in either of the tools relative to the other may be effected. Variable speed motors are also desirable since the speed of driving the tools may likewise be changed relative to each other.

It is also within the purview of the invention to utilize variable speed pulleys of the V type known in the art to be suitable for changing the relationship of the driven pulley to the drive pulley to vary the speed of operation of the pulleys 27 and 28. While the particular drive mechanism of the present invention is shown as being applied to a mixing machine, it is to be understood that it is not limited to this particular application but is useful for many purposes wherein multiple movements are desirable for performing a predetermined operation.

What is claimed is:

1. In a mixing device, a support, an L-shaped frame of channel section having a vertical and a horizontal portion opening outwardly and upwardly in continuation of each other, a motor carried by said vertical channel portion of said frame, a mixing mechanism carried by said horizontal channel portion of the frame and driven by said motor, means for securing said frame to said support, said motor extending partially from said vertical channel portion of the frame, and a cover for enclosing said motor and frame on the vertical portion thereof.

2. In a mixing device, a support, an L-shaped frame of channel section having a vertical and a horizontal portion opening outwardly and inwardly in continuation of each other, a motor carried by said vertical channel portion of said frame, a mixing mechanism carried by said horizontal channel portion of the frame and driven by said motor, means for securing said frame to said support, said motor extending partially from said vertical channel portion of the frame, a cover for enclosing said motor and frame on the vertical portion thereof, and a cover enclosing the horizontal channel portion of the frame.

3. In a mixing device, a support, a frame attachable to said support, a motor carried by said frame, a shaft on said motor, a pulley on said shaft, a mixing mechanism carried by said frame, said mixing mechanism comprising a pair of pulleys, a belt connecting the motor pulley to one of said pair of pulleys, belt shifting mechanism carried by said frame for shifting said belt relative to said pair of pulleys, a tool engaging shaft driven by one of said pair of pulleys, and a tool supporting element carried by said mechanism driven by the other of said pair of pulleys.

4. In a mixing device, a support, a frame attachable to said support, a motor carried by said frame, a shaft on said motor, a pulley on said shaft, a mixing mechanism carried by said frame, said mixing mechanism comprising a pair of pulleys, a belt connecting the motor pulley to one of said pair of pulleys, belt shifting mechanism carried by said frame for shifting said belt relative to said pair of pulleys, a tool engaging shaft driven by one of said pair of pulleys, a tool supporting element carried by said mechanism driven by the other of said pair of pulleys, and means carried by said frame for tilting the shaft and tool supporting element to various angular positions.

5. In a mixing device, a support, a frame attachable to said support, a motor carried by said frame, a shaft on said motor, a pulley on said shaft, a mixing mechanism carried by said frame, said mixing mechanism comprising a pair of pulleys, a belt connecting the motor pulley to one of said pair of pulleys, belt shifting mechanism carried by said frame for shifting said belt relative to said pair of pulleys, a tool engaging shaft driven by one of said pair of pulleys, a tool supporting element carried by said mechanism driven by the other of said pair of pulleys, means carried by said frame for tilting the shaft and tool supporting element to various angular positions, and a brake carried by said belt shifting mechanism for applying a brake to one pulley upon the shifting of the belt to the other pulley.

6. In a mixing device, a support, a frame attachable to said support, a motor carried by said frame, a shaft on said motor, a pulley on said shaft, a mixing mechanism carried by said frame, said mixing mechanism comprising a pair of pulleys, a belt connecting the motor pulley to one of said pair of pulleys, belt shifting mechanism carried by said frame for shifting said belt relative to said pair of pulleys, a shaft driven by one of said pair of pulleys, and a tool supporting element carried by said mechanism driven by the other of said pair of pulleys, said shaft and tool supporting element being supported in telescoped relation to each other.

7. In a mixing device, a support, a frame attachable to said support, a motor carried by said frame, a shaft on said motor, a pulley on said shaft, a mixing mechanism carried by said frame, said mixing mechanism comprising a pair of pulleys, a belt connecting the motor pulley to one of said pair of pulleys, belt shifting mechanism carried by said frame for shifting said belt relative to said pair of pulleys, a tool engaging shaft driven by one of said pair of pulleys, and a tool supporting element carried by said mechanism driven by the other of said pair of pulleys, said tool supporting element being mounted for universal movement.

8. In a mixing device, a support, a frame secured to said support, a motor carried by said frame, a pulley carried by said motor, a mixing mechanism carried by said frame having a pair of driving pulleys, a tool supporting element on said mechanism, driving means for rotating said tool supporting element on one pulley of said pair, a tool driving element on said supporting element, driving means for said tool driving element on the other pulley of said pair, means on said last driving means by which said elements are tilted relative to the axes of said pair of driving pulleys, a belt connecting said motor pulley to one of said driving pulleys, and a belt shifting mechanism carried by said frame for shifting said belt from one to the other pulley of said pair and into driving engagement with both pulleys of said pair.

9. In a mixing device, a support, a frame secured to said support, a motor carried by said frame, a pulley carried by said motor, a mixing mechanism carried by said frame having a pair of driving pulleys, a tool supporting element on said mechanism, driving means for rotating said tool supporting element on one pulley of said pair, a tool driving element on said supporting element, driving means for said tool driving element on the other pulley of said pair, means on said last driving means by which said elements are tilted relative to the axes of said pair of driving pulleys, a belt connecting said motor pulley to one of said driving pulleys, a belt shifting mechanism carried by said frame for shifting said belt from one to the other pulley of said pair and into driving engagement with both pulleys of said pair, and a container supporting element on said support aligned with said mechanism.

WILLY K. MAURER.
KURT F. SCHOEN.
KURT P. FREY.

REFERENCES CITED

The following references are of record in the file of this patent:

UNITED STATES PATENTS

| Number | Name | Date |
| --- | --- | --- |
| 1,438,281 | Westerman | Dec. 12, 1922 |
| 1,848,529 | Hoe | Mar. 8, 1932 |
| 1,859,690 | Aeschback | May 24, 1932 |
| 1,882,127 | Emmons | Oct. 11, 1932 |
| 2,054,666 | Van Guilder | Sept. 15, 1936 |
| 2,157,683 | Vollrath | May 9, 1939 |
| 2,185,155 | Meeker et al. | Dec. 26, 1939 |

FOREIGN PATENTS

| Number | Country | Date |
| --- | --- | --- |
| 140,309 | Great Britain | Aug. 5, 1919 |
| 597,702 | Great Britain | Feb. 2, 1948 |
| 635,177 | Germany | Sept. 11, 1936 |